Patented June 3, 1952

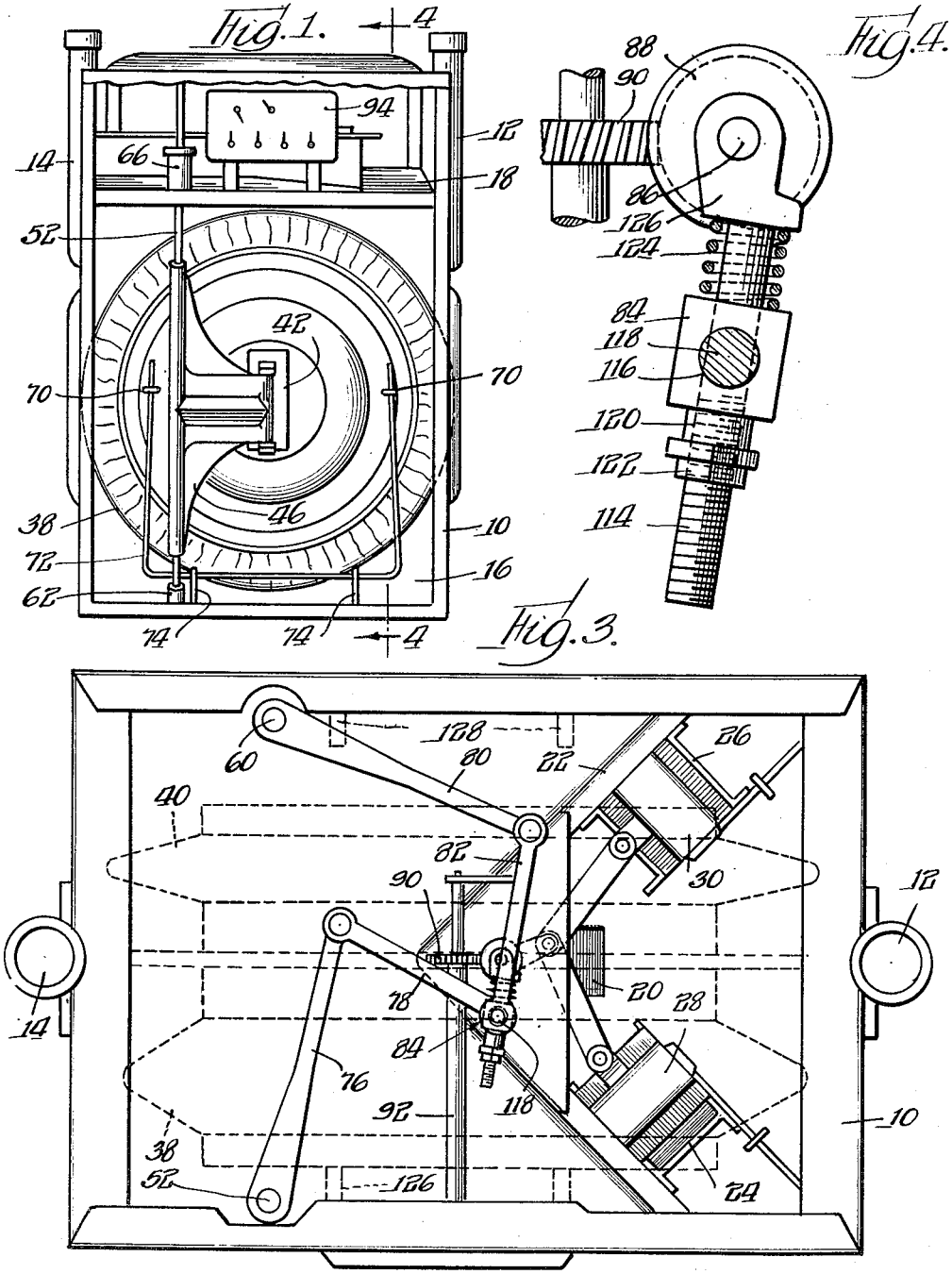

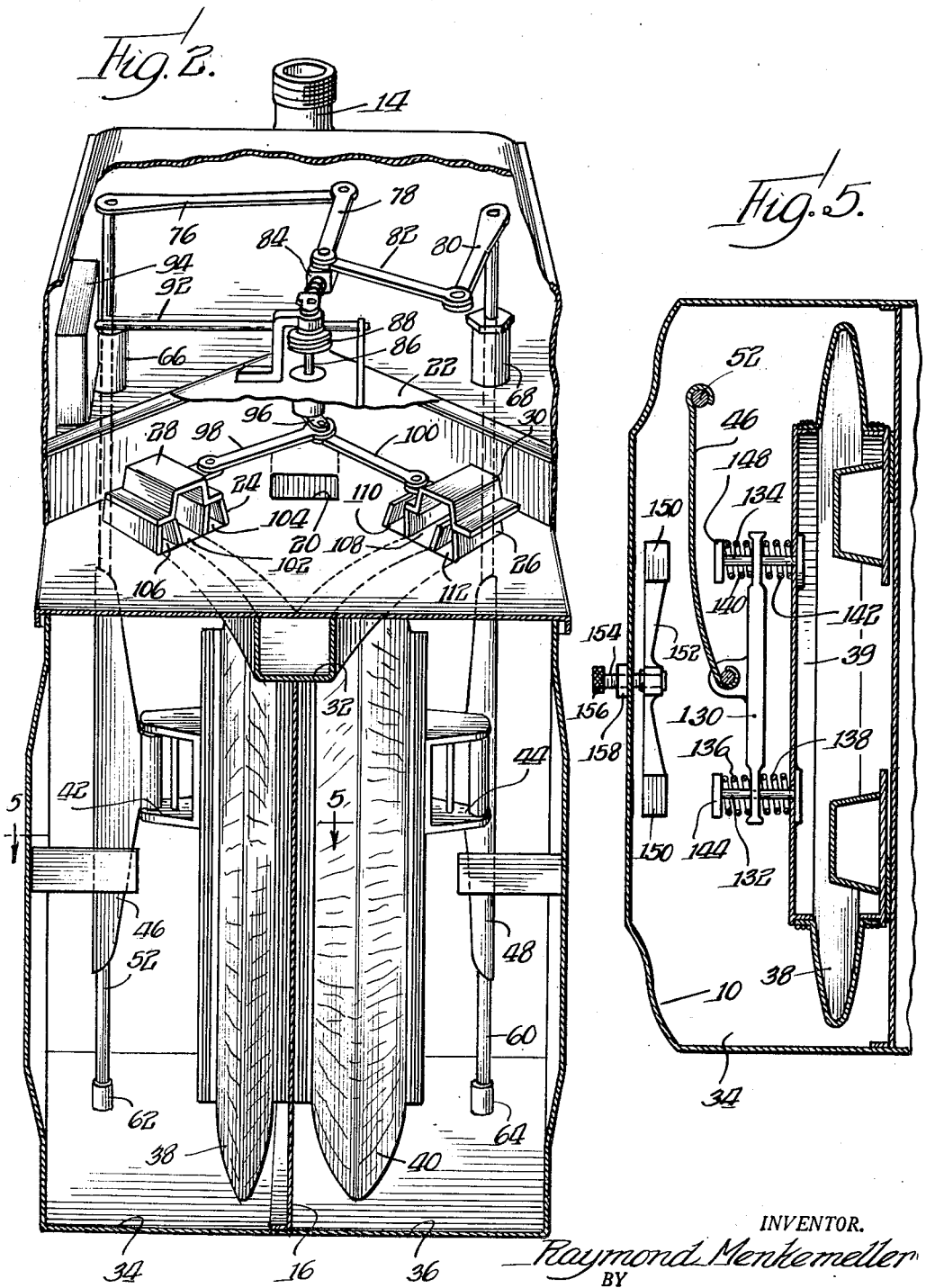

2,599,514

UNITED STATES PATENT OFFICE 2,599,514

FLUID METER

Raymond Menkemeller, Cedar Rapids, Iowa, assignor to American Meter Company, Incorporated, Chicago, Ill., a corporation of Delaware Application February 8, 1946, Serial No. 646,449

11 Claims. (Cl. 73—268)

The present invention relates to meters for gases and air, and more particularly to an improvement in meters which will minimize the amount of service and repair required to maintain accurate operation of the meters.

One of the common types of positive displacement meters for the measurement of gases is the standard Glover-type meter which employs a pair of bellows which through suitable interconnecting means actuate an index shaft connected to an index. The inter-connecting mechanism involves a number of cranks, levers, gears and arms which at the pivotal connections are subject to wear. So far in the past it has been necessary to periodically inspect and repair gas meters so as to be certain that the accuracy of operation is maintained within the normal tolerance limits. Whenever the pivotal connections to the various levers become worn the gas meter no longer is accurate and it is necessary to replace the mechanism inter-connecting the diaphragms and the index shaft. It, therefore, would be highly desirable to provide an improvement in this inter-connecting mechanism which would reduce the frequency of maintenance and repair of such meters. In accordance with the present invention, the movement of the diaphragm is positively limited so that the volume of gas passing through the meter per actuation of a diaphragm is constant irrespective of any wear occurring in the mechanism between the diaphragm and the valve crank shaft. A resilient link is included in the mechanism between the diaphragm and the valve crank shaft to compensate for a certain amount of wear at the moving points in the mechanism, thereby to greatly lengthen the periods between service and repair of the meter.

It, therefore, is an object of the present invention to provide in a positive displacement gas meter means for compensating for the wear occurring in the moving mechanism.

It is a further object of the present invention to provide in a gas meter a resilient connection between the diaphragm and the mechanism which actuates an index shaft and the valve mechanism.

It is a further object of the present invention to provide a resilient connection between the valve crank shaft and the diaphragm actuated mechanism in a gas meter.

Other and further objects of the present invention subsequently will become apparent by reference to the following description when taken in connection with the accompanying drawings wherein Fig. 1 shows a gas meter of the type embodying the present invention as seen with the front wall broken away;

Fig. 2 is a perspective side view showing the interior of the gas meter of Fig. 1 to which the present invention has been applied;

Fig. 3 is a top view showing the meter gallery and the valve table;

Fig. 4 is an enlarged view showing certain details of the construction illustrated in Fig. 3;

Fig. 5 is a plan view of another form of the embodiment of the present invention as seen in the direction of the arrows along the line 5—5 of the meter, such as that illustrated in Fig. 2.

For the purpose of illustrating and describing the present invention the drawings show the application of the invention to a standard Glover-type meter having a case made of a number of tinned steel plates soldered together to form a nearly rectangular box 10. U-shaped pipes 12 and 14 are attached vertically in the center of each side to provide inlet and outlet gas passages. The meter is divided into a plurality of principal compartments. The meter has a vertical partition 16 in the lower portion which extends up to a horizontal partition 18. The horizontal partition comprises the valve table above which is located the meter gallery. On the underside of the partition 18 there is provided a channel passage 20 which extends from the inlet in the pipe 14 to the valve box 22 which is a gastight chamber formed at one end of the upper chamber of the meter. Within the valve box are located a plurality of valves 24 and 26 each provided with valve covers 28 and 30. The valves 24 and 26 are inter-connected by an outlet channel 32 which is in communication with the outlet pipe 12.

The valve covers 28 and 30 control the flow of gas from the channel 20 into and out of the compartments below the table 18 formed by the partition 16. The partition 16 divides the lower portion of the meter case into a front compartment 34 and a back compartment 36. Each compartment contains a diaphragm 38 and 40 respectively. The diaphragms are of conventional structure formed of suitable discs of metal inter-connected by a leather member. Each diaphragm disc supports one of the bridge plates 42 and 44. The bridge plates 42 and 44 are connected to flags 46 and 48. The flags are mounted on flag rods 52 and 60 having their lower ends mounted in flag rod bearings 62 and 64 which are rigidly secured to the bottom of the meter case. The upper portions of the flag rods 52 and 60 pass through partition 18 through flag rod bushings 66 and 68. Each diaphragm disc is provided with a plurality of guides 70 as seen in Fig. 1 which engage a guide wire 72 supported at the bottom by guide wire bearings 74. These wires serve to guide the movements of the diaphragm so as to assist in maintaining the movements of the diaphragm laterally at the same speed.

The flag rods 52 and 60 are connected by flag arms to an adjustable tangent. Thus, the rod 52 is connected to a long flag arm 76 and a short flag arm 78. In a similar manner, the flag rod 60 is connected to a long flag arm 80 and a short flag arm 82. Short flag arms 78 and 82 are connected to an adjustable tangent 84. The adjustable tangent 84 is connected to a shaft 86 which extends through the cover of the valve box. The shaft 86 carries a worm 88 which engages a gear 90 mounted on an index axle 92. The index axle 92 is connected to the index or register 94 which is visible through a suitable window in the front of the meter. The lower extremity of the shaft 86 is connected to a crank 96 which is provided with two crank arms 98 and 100 which engage the valve covers 28 and 30 respectively. The valve covers 28 and 30 regulate the flow in and out of the valves 24 and 26. Each valve seat is provided with three ports. Thus, the center port 102 of the valve seat 24 communicates with the meter outlet through the forked channel 32. The port 104 communicates with the diaphragm 38, and the remaining port 106 communicates with the compartment 34. In a similar manner, valve 26 has a central port 108 which communicates with the forked channel 32, a port 110 which communicates with the diaphragm 40 and a port 112 which communicates with the chamber 36.

The meter thus far described merely illustrates the general type of meter to which the present invention is applicable. The operation of this type of meter is so well-known that it is believed unnecessary to set forth the details of such operation. It is believed sufficient to state that the valve covers are moved to close and uncover different ports so that while the gas in one diaphragm is being forced out into the outlet, gas in another diaphragm is forcing outwardly the gas in its compartment. The particular sequence of operation being well-known will be readily understood by those skilled in the art. The movements of the diaphragms serve as the motive power by means of the flags and flag arms to actuate the valve covers and, at the same time, to rotate the valve crank. Since the present invention is more particularly concerned with the provision for compensating for the wear or looseness in the mechanism inter-connecting the diaphragm discs with the valve crank, the explanation in the specification will be more particularly directed to such features.

While for the purpose of illustration the drawings show a Glover-type meter having a tinned steel case, it is to be understood that such showing does not constitute a limitation of the invention. In one embodiment the invention consists of a resilient connection between the flag arms 78 and 82 and the tangent 84. This is illustrated in Figs. 3 and 4, the latter figure showing in greater detail the construction involved. The tangent 84 consists of a tangent arm 114 eccentrically connected to the shaft 86. The tangent arm 114 carries a tangent wrist 116 slidably mounted on the tangent arm 114. The wrist 116 carries a shaft or pin 118 which engages the apertures in the ends of the short flag arms 78 and 82. The wrist 116 is limited in one direction by an adjustment collar 120 threaded on the tangent arm 114 and retained in adjusted position by a lock nut 122. The collar 120 and the lock nut 122 are located adjacent the outer end of the tangent arm 114 thereby to limit the outer position of the wrist 116 with respect to the axis of the shaft 86. In order to provide the necessary freedom of action of the wrist 116 due to loose motion of the flag, the flag arms, and the valve crank arms, there is provided a resilient connection consisting of a spring 124 interposed between the tangent wrist 116 and the tangent arm support boss 126. This resilient inter-connection between the flag arms and the index shaft 92 compensates for the wear occurring at the pivotal points of the mechanism which interconnects the diaphragm disc with the valve crank shaft as any tendency for movement of tangent 84 relatively toward the shaft 86 which may occur due to alteration of synchronism of the parts is taken up by the spring 124 which yields under pressure and later restores the tangent to abutment against the collar 120.

In order to provide for the accuracy of the operation of the diaphragms so that the measurement of the gas is correct even though there may be some lost motion or looseness in the flag mechanism, the case is provided with two sets of stops 126 and 128 which limit the expansive movement of the diaphragms 38 and 40 respectively. Thus, while the resilient connection 124 permits a certain amount of looseness in motion, the stops 126 and 128 positively insure accurate measurement of the gas passing through the meter.

Another manner of modifying the connection between the diaphragm and the valve crank shaft 86 is illustrated in the drawing in Fig. 5. The embodiment in Fig. 5 assumes that the conventional type of tangent mechanism 84 is employed in which the pivot or tangent is radially adjustable as by means of set screws and that all other elements are the same as in the present type of meter down to the connection of the flag to the disc of the diaphragm. Thus, in Fig. 5 there is shown the flag 46 which, however, is not connected through a rigid bridge 42 to the disc 39 of the diaphragm 38. A resiliently mounted bridge 130 is provided for connection to the outer extremity of flag 46. This bridge 130 is retained normally midway between the extremities of two rods 132 and 134 each rigidly secured to the diaphragm disc 39. The rod 132 is provided with two springs 136 and 138 arranged on opposite sides of the bridge member 130. Similarly, the rod 134 is provided with two springs 140 and 142 arranged on opposite sides of the bridge member 130. The rods 132 and 134 are provided with flat head members 144 and 148 respectively which are adapted to engage a pair of stops 150 carried by an adjustably positioned bridge or yoke 152. The bridge or yoke 152 may be moved to adjusted position by a threaded rod 154 having a knurled head 156. The rod is locked in adjusted position by a lock nut 158. The resilient interconnection between the diaphragm 38 and the flag mechanism including the flag 46 permits a certain amount of wear and lost motion to occur in the mechanism which actuates the valves 28 and 30. The stops 150 which engage the heads 144 and 148 of the members 132 and 134 respectively, however, insure a positive limit to the expansion of the diaphragm 38 so that accurate volume of gas is measured by each movement of the diaphragm. The illustration shown in Fig. 5 only shows one-half of the lower portion of the meter case, it being understood that the other portion of the meter case consisting of the chamber 36 is provided with a similar type of construction to inter-connect the flag 48 with the diaphragm 40.

From the foregoing, it will be seen that there has been described a plurality of ways in which the present invention may be applied to a conventional type of gas meter. Accordingly, it will be appreciated that similar arrangements may be made in other types of gas meters of the positive displacement type thereby to minimize the amount of repair and adjustment necessary for accurate indication of the gas passing through the meter. It, furthermore, will be appreciated that while certain specific embodiments of the invention have been illustrated, that the invention is not to be limited thereby as is apparent from the spirt and scope of the invention set forth in the following claims.

The invention is hereby claimed as follows:

1. In a positive displacement meter for gas having a case provided with a plurality of compartments, a diaphragm for each compartment, a valve for each diaphragm and each compartment, a crank shaft, a valve crank on said crank shaft for actuating said valves, and a linkage interconnecting said diaphragms with said crank shaft including an adjustable tangent comprising a tangent arm mounted transversely and tangentially on said shaft, a wrist shiftably mounted on said tangent arm, a stop on said tangent arm, and a resilient coupling urging the wrist against the stop on the tangent arm.

2. In a positive displacement meter for gas having a case provided with a plurality of compartments, a diaphragm for each compartment, a valve for each diaphragm and each compartment, a crank shaft, a valve crank on said shaft for actuating said valves, an adjustable tangent comprising a tangent arm and a wrist shiftably mounted thereon, said tangent arm being mounted transversely eccentrically on said crank shaft, means mounted adjacent the free end of said arm and adjustable therealong to limit the shifting of said wrist on said arm in one direction longitudinally thereof, and resilient means interposed between said wrist and a portion of said arm to permit shifting of said wrist on said arm in the opposite direction longitudinally thereof.

3. In a positive displacement meter for fluid media such as gas having a case containing a plurality of compartments, a diaphragm mounted in each compartment, a valve for each compartment and diaphragm, a valve crank for actuating said valves, a flag mounted on a flag rod for each compartment, flag arms connected to said flag rods, a tangent arm mounted on said valve crank, a connection between said tangent arm and said flag arms, a resilient connection between each flag and each diaphragm, and stop members mounted on the interior walls of said case for limiting the expansion of each of said diaphragms.

4. In a positive displacement meter for gas having a case divided into a plurality of compartments each containing a diaphragm, said diaphragms and compartments being provided with valves, a valve crank for said valves, a flag rod and flag for each compartment arranged to be actuated by the diaphragm therein, a plurality of stop members in each compartment for limiting the expansion of the diaphragm therein, a tangent mounted on said valve crank and comprising a stud eccentrically arranged relative to the axis of rotation of said valve crank, said tangent comprising an arm having a wrist shiftably mounted thereon, means located adjacent the free end of said arm for adjustably predetermining one limit of shifting of said wrist relative to said arm, a spring interposed between said wrist and a portion of said arm adjacent said crank, and a plurality of levers inter-connecting said wrist and said flag rods.

5. In a positive displacement meter for gas having a case containing a plurality of compartments each provided with a diaphragm therein, a valve for each compartment and diaphragm, a valve crank for actuating said valves, a flag mounted on a flag rod for each compartment, flag arms connected to said flags rods, a tangent arm mounted on said valve crank, an adjustable wrist mounted on said arm and connected to said flag arms, a plurality of stop members mounted on the interior walls of said compartments for limiting the expansion of each of said diaphragms, a bridge connected to each flag, and means secured to each diaphragm for resiliently supporting each bridge connected thereto to provide relative movement in two directions between that bridge and diaphragm.

6. In a positive displacement meter for gas having a case containing a plurality of compartments each provided with a diaphragm, a valve for each compartment and diaphragm, a valve crank for actuating said valves, an adjustable tangent mounted on said valve crank, a flag mounted on a flag rod for each compartment, flag arms interconnecting each flag rod with said adjustable tangent, a plurality of stop members mounted on the interior walls of each compartment for limiting the expansion of each diaphragm, a plurality of studs mounted on each diaphragm, each stud carrying a plurality of springs, a flag bridge connected to each flag, and each said flag bridge being mounted on said studs between the springs thereon.

7. In a positive displacement meter for fluid such as gas having a case containing a plurality of compartments, a diaphragm mounted in each compartment, a valve for each compartment and diaphragm, a valve crank, a plurality of levers interconnecting said valves with said valve crank, registering means, means interconnecting said registering means with said valve crank, a flag mounted on a flag rod for each compartment, flag arms interconnecting said flag rods with said valve crank, each diaphragm having a movable disc, the combination comprising a resilient connection between each flag and each diaphragm disc comprising a plurality of rods mounted on the diaphragm disc, a flag bridge connected at an intermediate point thereon to said flag said flag bridge being mounted on said rods, resilient spring members mounted on each side of said bridge on said rods normally to maintain said bridge at an intermediate position, and a plurality of stop members mounted within each compartment for engagement by the extremities of said rods to limit the expansion of the diaphragm.

8. In a positive displacement meter for gas having a pair of diaphragms mounted in a case having two compartments, valves for said diaphragm and compartments, a valve crank for said valves, a linkage interconnecting said diaphragms with said valve crank including a resilient connection for eliminating inaccuracy of operation of said valves due to wear at the pivotal points on said linkage, and adjustable stop means for limiting the expansion of each of said diaphragms to assure maximum expansion thereof.

9. In a positive displacement meter for fluid media having a pair of diaphragms, valves for said diaphragms, a crank shaft, a valve crank fixed on said shaft, lever means, first connection means arranged tangentially on said crank shaft, a pivotable connection between said first connection means and said lever means, a pair of pivoted shafts mounting said lever means, actuating levers on said shafts, second connection means on each diaphragm, a pivotable connection between each said second connection means and one of said actuating levers, at least one of said first and second connection means including a stud member and a coil spring arranged thereabout for locating the pivotable connection connected thereto, and means for limiting the expansion of said diaphragms to assure constant volume measurement each time the diaphragms are actuated.

10. In a positive displacement meter for fluid media having a pair of diaphragms mounted in two compartments, a pair of valves for said diaphragms, a crank shaft, a valve crank fixed on said shaft, a pair of sets of flag arms, first connection means arranged tangentially on said crank shaft, a pivotable connection between said first connection means and both of said pair of sets of flag arms, a pair of pivoted flag rods mounting said sets of flag arms, a flag on each of said rods, second connection means on each diaphragm, a pivotable connection between each said second connection means and one of said flags, at least one of said connection means including stud means and compression coil spring means arranged about such stud means for locating the pivotable connection connected thereto, and stop means arranged within said compartments for limiting the expansion of each of said diaphragms.

11. In a positive displacement meter for gas having a case provided with a plurality of compartments, a diaphragm for each compartment, a valve for each compartment and associated diaphragm, a crank shaft, a valve crank fixed on said shaft, lever means, first connection means arranged tangentially on said crank shaft, a pivotable connection between said first connection means and said lever means, a pair of pivoted shafts mounting said lever means, actuating levers on said shafts, second connection means on each of said diaphragms, a pivotable connection between each said second connection means and one of said actuating levers, at least one of said connection means including a stud member and a compression coil spring arranged thereabout for locating the pivotable connection connected thereto, a stop on said stud member controlling the effect of said spring, and means for limiting the expansion of said diaphragms to insure constant volume measurement each time the diaphragms are actuated.

RAYMOND MENKEMELLER.

REFERENCES CITED

The following references are of record in the file of this patent:

UNITED STATES PATENTS

| Number | Name | Date |
| --- | --- | --- |
| 16,049 | Darlington et al. | Nov. 11, 1856 |
| 94,235 | Nida | Aug. 31, 1869 |
| 170,895 | Philippi | Dec. 7, 1875 |
| 930,435 | Sutherland | Aug. 10, 1909 |
| 1,854,746 | Knight | Apr. 19, 1932 |
| 2,339,956 | Sillers | Jan. 25, 1944 |

FOREIGN PATENTS

| Number | Country | Date |
| --- | --- | --- |
| 547,252 | Great Britain | Aug. 20, 1942 |